March 26, 1935.    C. T. OLSON    1,995,813
OIL SEAL
Filed June 18, 1932
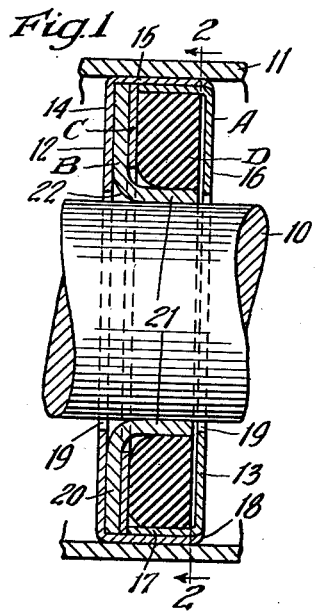
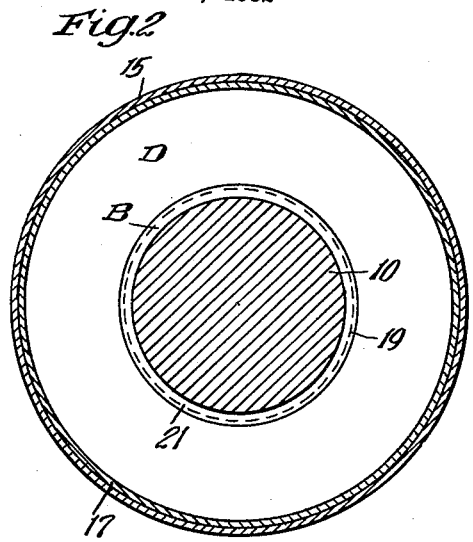
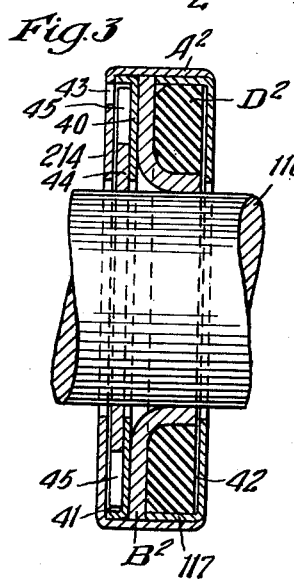
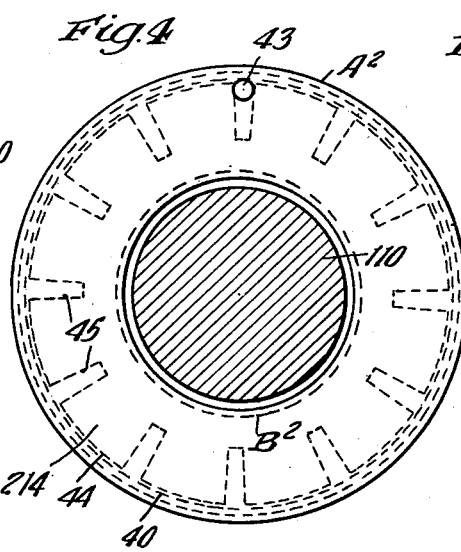
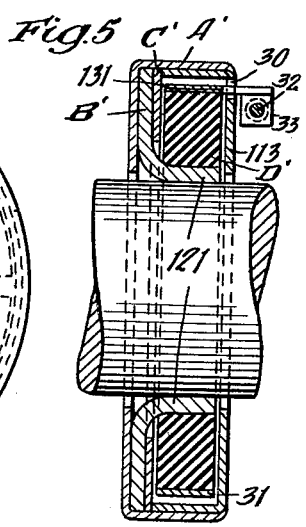
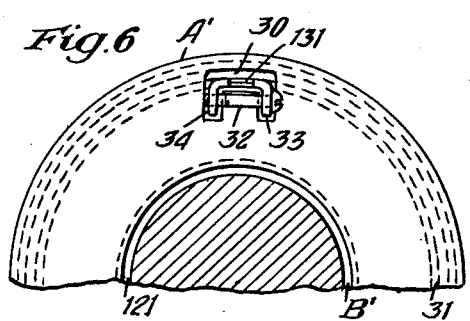
Inventor
Clarence T. Olson
By Joseph Harris
His Atty.

Patented Mar. 26, 1935

1,995,813

UNITED STATES PATENT OFFICE 1,995,813

OIL SEAL

Clarence T. Olson, Chicago, Ill., assignor to Chicago Rawhide Manufacturing Company, Chicago, Ill., a corporation of Illinois Application June 18, 1932, Serial No. 617,949

2 Claims. (Cl. 288—1)

This invention relates to improvements in oil seal.

One object of the invention is to provide an oil seal or oil retainer for shafts which may be economically manufactured and sold completely assembled as a unitary article and, as such, readily put in operative position.

Another object of the invention is to provide an oil seal of the type indicated having a packing which engages the shaft with a continuous and uniformly distributed resilient pressure.

Another object of the invention is to provide an oil seal of the character indicated in the preceding stated objects of the invention wherein is combined a secondary or auxiliary sealing device of the centrifugal type.

Still another object of the invention is to provide an oil seal of the character first indicated wherein adjustable means are provided for regulating the pressure between the packing and the shaft.

Other objects of the invention will more clearly appear from the description and claims hereinafter following.

In the drawing forming a part of this application, Figure 1 is a diametric, sectional view showing one embodiment of the improved oil seal in operative relation with respect to the shaft and shaft housing. Figure 2 is a vertical, sectional view, corresponding to the line 2—2 of Figure 1. Figure 3 is a view similar to Figure 1 illustrating another embodiment of the invention. Figure 4 is an end elevational view of the seal shown in Figure 3, looking from the lefthand side thereof. Figure 5 is a view similar to Figure 1, illustrating another embodiment of the invention. And Figure 6 is a side elevational view, partly broken away, of the seal shown in Figure 5.

In said drawing, and referring first to the construction illustrated in Figures 1 and 2, a portion of a shaft is indicated at 10 and portions of the surrounding housing are indicated in section at 11, it being understood that the housing in the form shown, has a cylindrical interior opening concentric with the shaft.

The improved oil seal, as shown in Figures 1 and 2, comprises, broadly, a shell or casing designated generally by the reference character A; a packing B; a clamping plate C; and an inherently resilient pressure ring D.

The casing A is preferably composed of two cup shaped sheet metal members 12 and 13. The member 12 has a radially extending side wall 14 and a circular peripheral wall 15 and the member 13 has a corresponding radial side wall 16 and a peripheral wall 17, the latter being snugly telescoped within the peripheral wall 15, but of lesser width than the latter for the reason hereinafter described. The two members 12 and 13 with the other parts within the casing are held in assembled relation by any suitable means such as by spinning the free edge 18 of the outer member over the inner member 13, as clearly shown, thus adapting the oil seal for shipment and application as an assembled unitary structure. Both side walls of the casing are centrally apertured, as indicated at 19—19, to accommodate the shaft 10 which passes therethrough, said openings 19 being made of slightly greater diameter than that of the shaft with which it is intended to cooperate so as not only to facilitate slipping the seal lengthwise of the shaft but also to allow for any slight eccentricity of the shaft that may occur when rotating.

The washer B may be made of any suitable pliable and/or flexible material, such as leather, fabric or cork composition. The washer is made of annular form with a radially extending flange section 20 and a sleeve or cylindrical section 21. In actual practice, the sleeve section 21, which is shown as truly cylindrical when applied on the shaft in Figure 1, will initially be formed with a taper toward the right, as viewed in Figure 1, that is, with the free edge portion of the sleeve section of somewhat lesser diameter than the shaft over which it is intended to be applied, so that when applied, it will be somewhat distended to the true cylindrical form shown and thus provide a snug fluid-tight engagement with the shaft. The flange section 20 of the washer will be made, preferably, of such outside diameter as to fit snugly within the peripheral wall 15 and will be held tightly clamped against the end wall 14 by the clamping plate or washer C, which in turn is held in fixed position by the free edge of the inner telescoped wall 17. In this manner, the washer B, considered as an entirety, is held against movement transverse to the shaft but with the sleeve portion 21 thereof free to adjust itself laterally in consonance with any eccentric movement of the shaft 10. The clamp plate C is an annular disc, preferably of sheet metal, and with the interior opening thereof of sufficiently enlarged diameter to permit the necessary flexing of the washer around the bend without cutting thereinto.

The pressure ring D may be made of any suitable material that is inherently resilient and compressible and which will not be injuriously, or appreciably injuriously, affected by any of the ordinary lubricants. One such material suitable for the purpose, is a specially prepared rubber compound now obtainable commercially and which will not swell or disintegrate under the action of oil. The pressure ring D, as shown in Figure 1, is of substantially rectangular cross section with its inner inside corner preferably rounded off, as indicated at 22, so as to allow for the bend in the washer B. In cross sectional area, the ring D is slightly less than the cross sectional area of the chamber within which it is disposed, as indicated in the drawing. With the arrangement shown, it will be observed that an extended continuous or uninterrupted area or surface contact is obtained between the ring D and the sleeve section 21 of the washer, thus providing a perfectly uniform, yieldable pressure on the washer between the latter and the shaft at every point therearound. In this connection, it will be understood that the inner diameter of the ring D is initially made slightly less than the outside diameter of the sleeve section 21 of the washer when the latter is distended to encircle the shaft 10 so as to insure the constancy of the constricting pressure from the ring D.

Referring next to the construction shown in Figure 5, the casing A' is or may be the same as the casing A, first described, with an additional opening 30 in the member 113 for accommodating certain tensioning devices hereinafter described. On its interior is employed a washer B' similar to the washer B and held in place in the same manner by a clamp plate C'.

An annular compression ring D' is employed composed of material similar to the ring D, the same being of such outside diameter as to leave an annular space between it and the inner surface of the peripheral wall of the casing within which is received a split tension band 31 of spring steel or the like with the ends thereof of reduced thickness and slidably overlapping, as indicated at 131, somewhat in the nature of a piston ring. The band 31 is initially made so that it will exert a moderate constricting pressure on the ring D', said pressure being adjustable by means of a screw 32. The latter is passed through a depending flange 33 formed integrally on one end of the band 31 and extended outwardly of the casing, as shown in Figure 5, the other threaded end of the screw 32 cooperating with a threaded opening in a corresponding flange 34 integral with the other end of the band 31, as best shown in Figure 6. In the Figure 5 modification, there will be an initial normal amount of constricting pressure on the sleeve section 121 of the washer and the ring D' and its encircling band 31 will be of such size as to allow of a reasonable amount of floating radially to accommodate any eccentric motion of the shaft, as will be understood.

Referring next to the modification shown in Figure 3, the casing A² is or may be the same as the casing A. The casing A², however, is formed with two separated interior compartments by a partition plate 40 of preferably sheet metal drawn in the form of a shallow cup so as to provide an inner chamber 41 and an outer chamber 42. The side wall 214 of the casing is provided near the periphery thereof and preferably at the top, with a discharge opening 43, communicating with the chamber 41. Within the chamber 41 and freely rotatable therein is an impeller, rotor, or slinger 44 of suitable material such as leather, fabric, fibre, micarta, or cork composition. Said impeller is made in the form of an annular disc with the center opening thereof initially of slightly lesser diameter than the shaft with which it is to be used so that, when the unitary seal is slipped in place a fluid-tight, friction driving fit will be obtained between said impeller and the shaft, thus insuring rotation of the impeller 44 when the shaft is rotated and forming a fluid-tight seal between it and the shaft. Around its periphery and uniformly spaced are preferably radially disposed notches or recesses 45 in the impeller 44 which successively pass the discharge opening 43 as the impeller is rotated. As oil or other lubricant tends to travel lengthwise of the shaft 110 toward the right, as viewed in Figure 3, it will be caught or collected by the impeller 44 and, due to the rotation of the latter, will be gradually thrown or slung outwardly under centrifugal action until it either passes into the notches 45 or reaches the outer zone of the chamber, the impeller acting as a pump and ultimately forcing the lubricant back through the opening 43 into the housing chamber. In actual practice, the thickness of the impeller disc 44 will be made such as to provide a running clearance with the chamber walls.

A second or auxiliary seal is utilized substantially in the form of that shown in Figure 1, the same comprising a similar washer B² clamped against the partition 40 by the peripheral wall 117 of the inner telescoped shell member. A corresponding compression ring D² is also employed. By utilizing the two sealing arrangements shown in the Figure 3 modification, it is evident that any lubricant that may pass the impeller 44 into the chamber 42 will nevertheless be caught and retained by the sealing washer arrangement shown and, furthermore, the washer B² will serve to prevent admission of any water, dust or other foreign matter coming from the right along the shaft.

As will be understood by those skilled in the art, certain of the clearances or spacings shown in the drawing have been somewhat exaggerated in order to more clearly disclose the intended nature of the construction, such, for instance, as the clearance allowed for the impeller 44 in Figure 3, the axial openings for reception of the shaft and others. In all the forms it will be seen that the same may be manufactured and sold as assembled units, that the seals are applied as a unit merely by slipping the same lengthwise of the shaft into the proper position and, when in position, provide for a fluid-tight but rotative joint between the seal and the shaft and a fluid-tight engagement between the casing and surrounding housing. Each of the component parts is such as to readily lend itself to inexpensive mass production; the parts may be readily assembled without special apparatus and when assembled, retained in their assembled position by spinning the outer casing member over the inner casing member.

While the preferred manner of carrying out the invention has been illustrated and described, it will be understood that various changes and modifications may be made without departing from the spirit of the invention and all such changes and modifications are contemplated that come within the scope of the claims appended hereto.

What is claimed is:

1. As an article of manufacture a seal for insection as an assembled unit within a housing having an interiorly located shaft therein, said seal including: a unified casing having a peripheral wall for press fit engagement with the housing, two side walls, and an intermediate radial partition dividing the casing into two compartments, said side and partition walls being apertured to accommodate the shaft; a flexible packing in one of said compartments and having an axial sleeve section adapted to engage the shaft; yieldable means encircling said sleeve section effective to constrict the latter against the shaft; and a centrifugally-acting impeller rotatable in the other of said compartments, said casing having a discharge opening in that side wall thereof defining the impeller chamber, and said impeller being adapted to move along the shaft in the compartment in which it is confined into pressed fit engagement with the shaft.

2. A self-contained sealing unit for insertion in a housing about a shaft in pressed fit association with the housing, comprising an annular sheet metal casing, an annular sheet leather packing secured within the casing and provided at its inner periphery with an axially projecting tubular portion for engagement with the shaft, and a ring of solid but resiliently expansible material sleeved over the tubular portion of the packing, which ring is of less axial extent than the space provided for the same within the casing, whereby to permit it to expand axially within the casing upon being distended at its inner periphery by the tubular portion of the packing.

CLARENCE T. OLSON.